(12) United States Patent
Shen

(10) Patent No.: US 10,241,283 B1
(45) Date of Patent: Mar. 26, 2019

(54) SIGNAL TRANSMISSION CABLE WITH HDMI CONNECTORS

(71) Applicant: SURE-FIRE ELECTRICAL CORPORATION, New Taipei (TW)

(72) Inventor: Chun-Lai Shen, New Taipei (TW)

(73) Assignee: Sure-Fire Electrical Corporation, New Taipei (TW)

( * ) Notice: Subject to any disclaimer, the term of this patent is extended or adjusted under 35 U.S.C. 154(b) by 0 days.

(21) Appl. No.: 15/966,061

(22) Filed: Apr. 30, 2018

(51) Int. Cl.
  *G02B 6/42* (2006.01)
  *H04B 10/25* (2013.01)
  *H04N 21/4363* (2011.01)

(52) U.S. Cl.
  CPC ........ *G02B 6/4246* (2013.01); *H04B 10/2503* (2013.01); *H04N 21/43635* (2013.01)

(58) Field of Classification Search
  None
  See application file for complete search history.

(56) References Cited

U.S. PATENT DOCUMENTS

2011/0091219 A1* 4/2011 Tatum ................. G02B 6/4201
  398/142

* cited by examiner

*Primary Examiner* — Chad H Smith
(74) *Attorney, Agent, or Firm* — Rosenberg, Klein & Lee

(57) ABSTRACT

The present invention relates to a signal transmission cable with HDMI connectors, and the signal transmission cable uses an optical fiber inside the cable to transmit optical signal. A first HDMI connector comprises a transmission terminal group for transmitting electric signal, and first and second electro-optic conversion modules and a first optical transmission fiber module which all are configured to transmit electric signal, convert electric signal into optical signal, and transmit optical signal to the cable. A second HDMI connector is connected to other end of the cable and comprises a second optical transmission fiber module, first and second photo-electric conversion modules which all are configured to receive the optical signal from the cable, and convert optical signal into electric signal, and a signal terminal group transmitting electric signal. Therefore, the signal transmission cable can provide function of converting and transmitting optical signal and electric signal in bi-direction.

7 Claims, 2 Drawing Sheets

SIGNAL TRANSMISSION CABLE WITH HDMI CONNECTORS

BACKGROUND OF THE INVENTION

1. Field of the Invention

The present invention relates to a signal transmission cable with HDMI connectors. More particularly, the present invention provides a signal transmission cable capable of transmitting optical signal and electric signal, and a first HDMI connector and a second HDMI connector are electrically connected to two ends of the cable, so as to convert the electric signal into the optical signal, or convert the optical signal into the electric signal, thereby achieving the purpose of performing bi-directional transmission through the cable.

2. Description of the Related Art

As the signal transmission technology is improved from the analog signal transmission to the digital signal transmission, video signal transmission becomes faster, and the quality of the transmitted video and audio is further improved. For example, 4K or 8K high-definition video players, Blu-ray DVD players, high-definition digital set-top boxes, high-definition projectors or UHD television, full-HD display screens, personal computers or TV games, can provide people with has clearer and more detailed audio and video with higher quality when playing a variety of electronic video/audio signals.

The transmission of digital high-definition audio/video signals is usually performed through a high-definition multimedia transmission interface (HDMI), which is a special digital transmission interface applying a digital video/audio transmission interface technology for audio and video signal transmission, and is able to simultaneously transmit uncompressed audio and image signals. With the release of HDMI 2.0 and HDMI 2.1 specifications, the HDMI device can support transmission of high dynamic range (HDR) video with bandwidth up to 18 Gbps 4K@50 Hz/60 Hz (2160P), and can synchronously transmit video of 60 frames per second at resolutions of 4096×2160p, 7680×4320, or 10K, so as to provide sufficient bandwidth support for UHD, 4K, or 8K transmissions. As a result, the HDMI device can transmit the video with resolution 4 times of the resolution of a 1080/60 movie, and also can transmit audio signal through up to 32 audio channels for multi-dimensional audio experience, thereby enabling home theater and other video/audio environment equipment to provide more selection modes for user. The HDMI device can improve the maximum audio sampling rate up to 1536 KHz, so as to achieve double audio fidelity.

The HDMI is implemented based on the IIC serial bus E-DDC transmission control protocol, in which the E-DDC control signals include Extended Display Identification Data (EDID), High-Bandwidth Digital Content Protection (HDCP), Status Control Data Channel (SCDC). A signal source device can be in communication with a display device by using the E-DDC control signals. In order to make low-frequency impedance of a cable more stable, the SCL and SDA cables are manufactured using TMDS method.

In recent years, higher versions of HDMI 2.0 and HDMI 2.1 is defined to require higher signal transmission rate for audio/video signals, and the amount of information related to the displayer transmitted by E-DDC control signals is also increasing, so the requirements for cable are also getting higher and higher. However, the conventional cable is hard to meet the requirement in long-distance transmission for HDMI signals because of the attenuation of high-speed signal and the increase of crosstalk during electric signal transmission in cable. When the amount of E-DDC transmission data increases and a conventional photo-electric composite cable cannot reduce the capacitance of the copper cable, it results in poor cable compatibility. Furthermore, the manufacturing cost of the high-level cable also rapidly increases along with the increase of the cable length.

Therefore, what is needed is to develop a signal transmission cable to solve above-mentioned problems of the conventional cable and conventional photo-electric composite cable.

SUMMARY OF THE INVENTION

In order to solve aforementioned problems and drawbacks, the inventor collects associated data and performs multiple tests and modifications according to years of experience, so as to develop the signal transmission cable with HDMI connectors. The signal transmission cable uses a photo-electric conversion technology to convert the audio signal and E-DDC control signal of HDMI into optical signal, and transmit the optical signal through an optical fiber, so as to solve the problem caused in transmission of audio/video signal and E-DDC control signal in long distance between a video source and a displayer.

An objective of the present invention is to provide the signal transmission cable in which the optical signal is transmitted through the optical fiber inside the cable, the first HDMI connector is electrically connected to an end of the cable and comprises a transmission terminal group configured to transmit electric signal, and further comprises a first electro-optic conversion module, a second electro-optic conversion module and a first optical transmission fiber module which all are in cooperation with each other to convert the electric signal into optical signal and transmit the optical signal to the cable; and, a second HDMI connector is electrically connected to other end of the cable opposite to the first HDMI connector, the second HDMI connector comprises a second optical transmission fiber module, a first photo-electric conversion module and a second photo-electric conversion module which are in cooperation with each other to receive the optical signal transmitted from the cable and convert the optical signal into the electric signal, and the second HDMI connector further comprises a signal terminal group configured to transmit the electric signal. As a result, the signal transmission cable with HDMI connectors can provide function of converting and transmitting the optical signal and the electric signal in bi-direction.

Another objective of the present invention is that the transmission terminal group of the first HDMI connector is used to transmit four-channel high-speed differential pair TMDS signals or five-channel low-speed signals, and the first HDMI connector comprises a first signal conversion module configured to convert the five-channel low-speed signals into low-voltage differential signals, or convert the low-voltage differential signals into the five-channel low-speed signals. The first HDMI connector comprises the first electro-optic conversion module, the first signal conversion module and the second electro-optic conversion module. The first electro-optic conversion module can be used to convert the four-channel high-speed differential pair TMDS signals into the first optical signal, and the first signal conversion module can convert the five-channel low-speed signals into the low-voltage differential signals, and the second electro-optic conversion module can be used to convert the low-voltage differential signals into second optical signal.

The other objective of the present invention is that the second HDMI connector comprises the first photo-electric conversion module, the second photo-electric conversion module and a second signal conversion module. The first photo-electric conversion module can receive the optical signal transmitted from the cable, and convert the optical signal into the four-channel high-speed differential pair TMDS signals. The second photo-electric conversion module can convert the optical signal into the low-voltage differential signals, and the second signal conversion module can convert the low-voltage differential signals into the five-channel low-speed signals. The second signal conversion module can be used to perform conversion between the five-channel low-speed signals and the low-voltage differential signals. The second HDMI connector further comprises a third electro-optic conversion module configured to convert the electric signal, which is converted by the second signal conversion module, into third optical signal, and transmit the third optical signal to the cable and the first HDMI connector. The first HDMI connector comprises a third photo-electric conversion module configured to convert the third optical signal into the low-voltage differential signal. The first HDMI connector further comprises the first signal conversion module configured to convert the low-voltage differential signals into the five-channel low-speed signals. the second HDMI connector is electrically connected to a power supply device configured to supply electric energy. Preferably, the power supply device is a USB transmission cable or a power cable.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
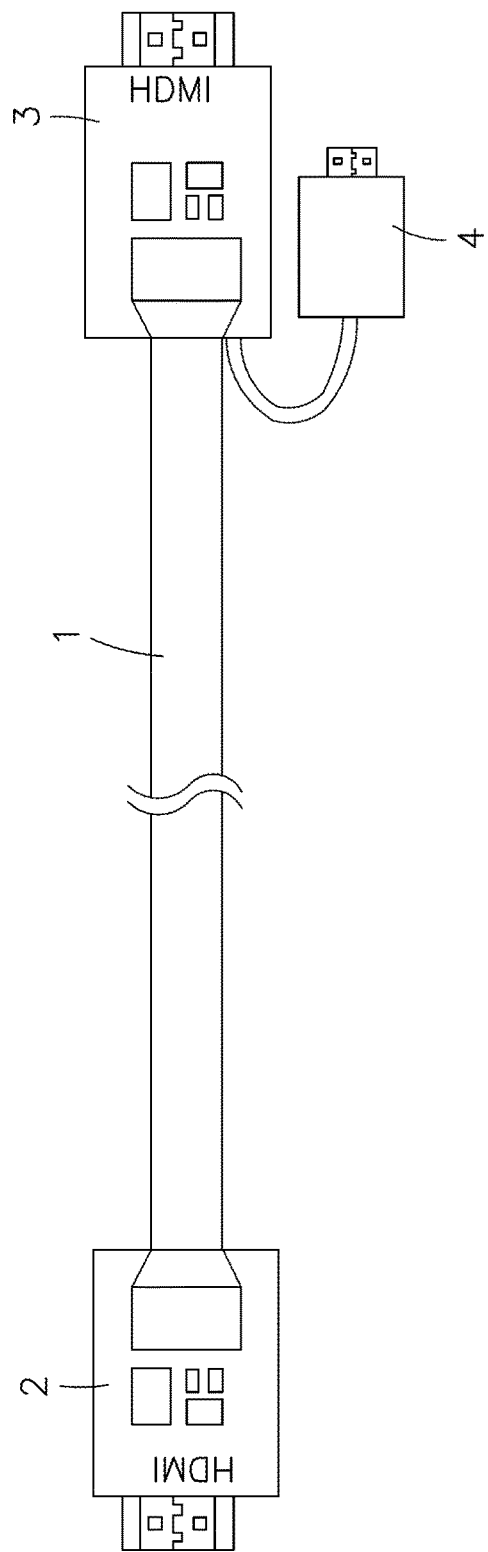
FIG. 1 is a top plain view of a signal transmission cable with HDMI connectors, in accordance with an embodiment of the present invention.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Figure 2:
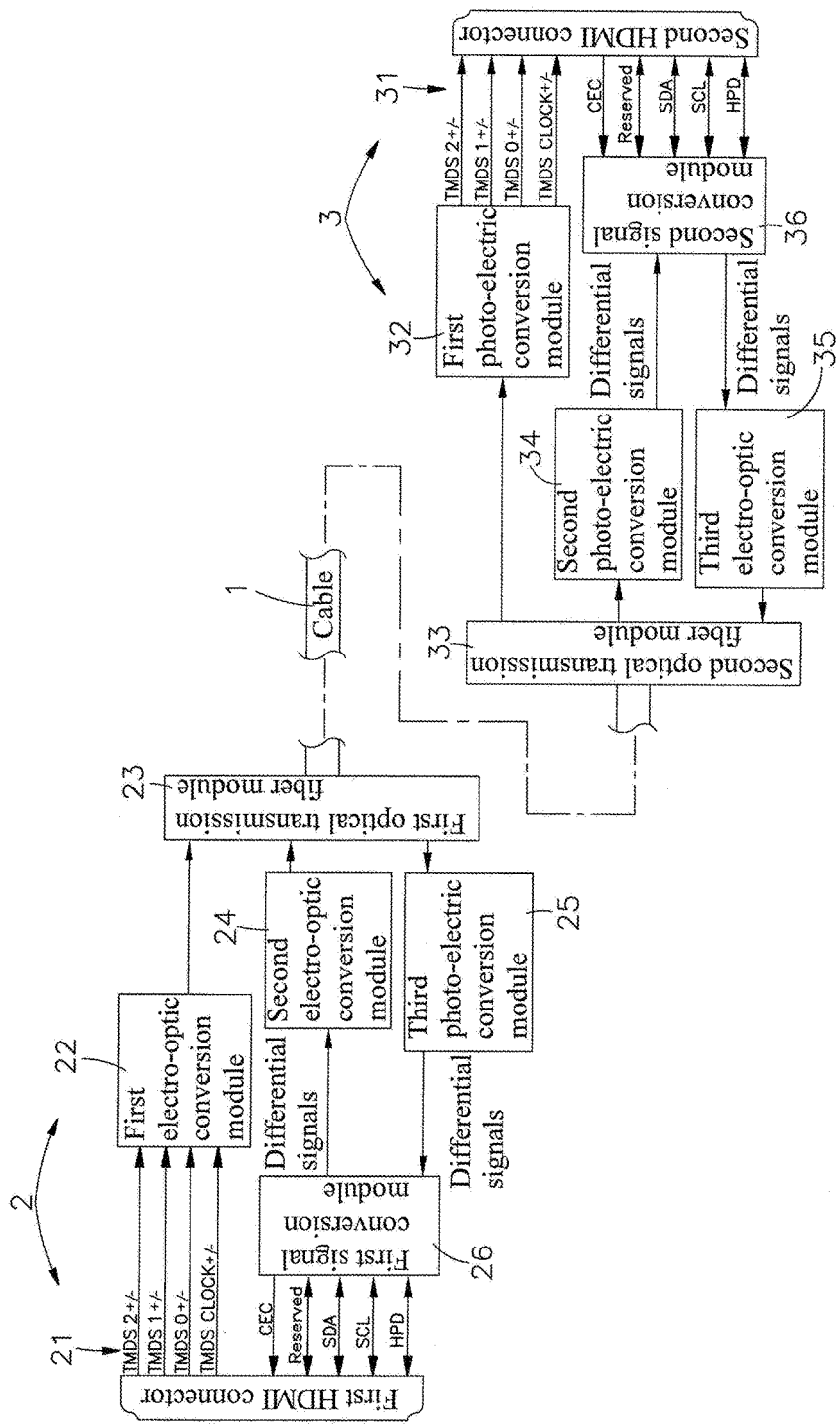
FIG. 2 is a circuit block diagram of a signal transmission cable with HDMI connectors, in accordance with an embodiment of the present invention.

Please refer to FIGS. 1 and 2, which show top plain view and circuit block diagram of a signal transmission cable with HDMI connectors, in accordance with an embodiment of the present invention. As shown in FIGS. 1 and 2, the signal transmission cable comprises a cable 1, a first HDMI connector 2 and a second HDMI connector 3.

The cable 1 comprises an optical fiber configured to transmit the optical signal.

The first HDMI connector 2 comprises a transmission terminal group 21, a first electro-optic conversion module 22 electrically connected to the transmission terminal group 21, a first optical transmission fiber module 23 electrically connected to the first electro-optic conversion module 22, a second electro-optic conversion module 24 and a third photo-electric conversion module 25 which both are electrically connected to the first optical transmission fiber module 23, and a first signal conversion module 26 electrically connected to the second electro-optic conversion module 24 and the third photo-electric conversion module 25 both. The first signal conversion module 26 is electrically connected to the transmission terminal group 21.

The second HDMI connector 3 comprises a signal terminal group 31, a first photo-electric conversion module 32 electrically connected to the signal terminal group 31, a second optical transmission fiber module 33 electrically connected to the first photo-electric conversion module 32, a second photo-electric conversion module 34 and a third electro-optic conversion module 35 which both are electrically connected to the second optical transmission fiber module 33, and a second signal conversion module 36 electrically connected to the second photo-electric conversion module 34 and the third electro-optic conversion module 35 both. The second signal conversion module 36 is electrically connected to the signal terminal group 31.

In order to assemble and apply aforementioned components, the first HDMI connector 2 and the second HDMI connector 3 are electrically connected to two ends of the cable 1; in the second HDMI connector 3, low frequency signal can be transmitted to the first HDMI connector 2 through the cable 1. The first HDMI connector 2 can be used to perform conversion between the electric signal and the optical signal, and the converted optical signal is transmitted to the second HDMI connector 3 through the cable 1, and the second HDMI connector 3 can be sued to perform conversion between the optical signal and the electric signal. As a result, the objective of performing conversion between optical signal and electric signal in bi-directional can be achieved.

In order to use the signal transmission cable of the present invention, the first HDMI connector 2 and the second HDMI connector 3 can be electrically connected between preset electronic/electric products, for example, between television and Blu-ray player, television and DVD player, video recorder and displayer, audio equipment and audio recorder or home theater. The transmission terminal group 21 of the first HDMI connector 2 receives the electric signal from one of the preset electronic/electric products, and then transmits the electric signal to the first electro-optic conversion module 22, and the first electro-optic conversion module 22 converts the electric signal into the optical signal. The first optical transmission fiber module 23 transmits the converted optical signal to the second optical transmission fiber module 33 of the second HDMI connector 3 through the cable 1. The second optical transmission fiber module 33 receives the optical signal from the cable 1, and transmits the received optical signal to the first photo-electric conversion module 32, and the first photo-electric conversion module 32 converts the optical signal into the electric signal and then transmits the converted electric signal to the signal terminal group 31. The converted electric signal is transmitted to the other of preset electronic/electric products through the signal terminal group 31.

The first HDMI connector 2 comprises the first electro-optic conversion module 22, and the second HDMI connector 3 comprises the first photo-electric conversion module 32, so that the audio signal, the video signal and the DDC control signals of HDMI can be converted into the optical signal, and the optical signal can be transmitted through the optical fiber inside the cable 1, thereby solving the attenuation and crosstalk problem caused during audio signal transmission, video signal transmission, or transmission between the preset electronic/electric products in long distance.

Furthermore, the electric signal of one of the preset electronic/electric products, received by the transmission terminal group 21 of the first HDMI connector 2, can include four-channel high-speed differential pair TMDS signals or five-channel low-speed signals, and the first electro-optic conversion module 22 of the first HDMI connector 2 can convert the four-channel high-speed differential pair TMDS signals into the first optical signal and transmit the first optical signal to the first optical transmission fiber module 23, The first optical signal is then transmitted to the second optical transmission fiber module 33 of the second HDMI connector 3 through the cable 1. The first photo-electric conversion module 32 can convert the first optical signal into the first electric signal, and the converted electric signal is transmitted to the other of the preset electronic/electric products through the signal terminal group 31, so that the high-frequency signal transmission can be performed between the first HDMI connector 2 and the second HDMI connector 3 to implement electro-optical signal conversion process and the photo-electric signal conversion process for the four-channel high-speed differential pair TMDS signals, thereby achieving the objective of ultra high-definition long distance transmission for the first optical signal. Furthermore, in the first HDMI connector 2, the first signal conversion module 26 can perform conversion between the five-channel low-speed signals and the low-voltage differential signals, and the second electro-optic conversion module 24 can convert the low-voltage differential signals into the second optical signal and transmit the second optical signal to the first optical transmission fiber module 23. The second optical signal is then transmitted to the second optical transmission fiber module 33 of the second HDMI connector 3 through the cable 1, The second photo-electric conversion module 34 can convert the second optical signal into the second electric signal, and the second signal conversion module 36 transmits the second electric signal to the other of the preset electronic/electric products through the signal terminal group 31, so that the low frequency signal can be transmitted between the first HDMI connector 2 and the second HDMI connector 3, to achieve the conversion between the five-channel low-speed signals and the low-voltage differential signals, and the conversion process between the electro-optical signal and the photo-electric signal, thereby achieving the objective of ultra high-definition long distance transmission for the second optical signal.

The signal terminal group 31 of the second HDMI connector 3 can receive the five-channel low-speed signals from one of the preset electronic/electric products, and transmit the five-channel low-speed signals to the third electro-optic conversion module 35 through the second signal conversion module 36. The third electro-optic conversion module 35 converts the five-channel low-speed electric signals into third optical signal, and transmit the third optical signal to the first optical transmission fiber module 23 of the first HDMI connector 2 through the second optical transmission fiber module 33 and the cable 1. After receiving the third optical signal, the first optical transmission fiber module 23 transmits the third optical signal to the third photo-electric conversion module 25, and the third photo-electric conversion module 25 converts the third optical signal into the third electric signal. The converted electric signal is transmitted to the transmission terminal group 21 through the first signal conversion module 26, and the transmission terminal group 21 transmits the third electric signal to the other of the preset electronic/electric products, so as to perform the conversion between the five-channel low-speed signals and the low-voltage differential signals, and the conversion process between the electro-optical signal and the photo-electric signal, thereby achieving the objective of ultra high-definition long distance transmission for the third optical signal.

The first optical transmission fiber module 23 of the first HDMI connector 2 and the second optical transmission fiber module 33 of the second HDMI connector 3 can use 45° FA or triangular prism to perform total-reflection, so as to transmit the optical signal through the optical fiber of the cable 1, and form an optical path for 90-degree transmission.

In order to operate the second HDMI connector 3 normally, the second HDMI connector 3 can be electrically connected to a power supply device 4 such as a USB transmission cable or a power cable, for provide electric energy to the second HDMI connector 3.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A signal transmission cable with HDMI connectors, comprising a cable, and a first HDMI connector and a second HDMI connector electrically connected to two ends of the cable, wherein the cable comprises an optical fiber disposed inside and configured to transmit an optical signal;

wherein the first HDMI connector is electrically connected to an end of the cable and comprises a transmission terminal group configured to transmit electric signals, a first electro-optic conversion module, a second electro-optic conversion module and a first optical transmission fiber module, wherein the first electro-optic conversion module, the second electro-optic conversion module and first optical transmission fiber module are configured to convert the electric signals, transmitted from transmission terminal group, into the optical signal and transmit the optical signal to the cable, the transmission terminal group of the first HDMI connector being configured to transmit four-channel high-speed differential pair TMDS signals or five-channel low-speed signals, and the first HDMI connector comprises a first signal conversion module configured to convert the five-channel low-speed signals into low-voltage differential signals, or convert the low-voltage differential signals into the five-channel low-speed signals;

wherein the second HDMI connector is electrically connected to other end of the cable opposite to the first HDMI connector, and comprises a second optical transmission fiber module, a first photo-electric conversion module, a second photo-electric conversion module and a signal terminal group, wherein the second optical transmission fiber module, the first photo-electric conversion module, the second photo-electric conversion module are configured to receive the optical signal transmitted from the cable and convert the optical signal into the electric signals, and the signal terminal group is configured to transmit the electric signals.

2. The signal transmission cable according to claim 1, wherein the first HDMI connector comprises the first electro-optic conversion module configured to convert the four-channel high-speed differential pair TMDS signals into a first optical signal, the first signal conversion module being configured to convert the five-channel low-speed signals into the low-voltage differential signals, and the second electro-optic conversion module configured to convert the low-voltage differential signals into a second optical signal.

3. The signal transmission cable according to claim 1, wherein the second HDMI connector comprises a second signal conversion module configured to perform conversion between five-channel low-speed signals and low-voltage differential signals.

4. The signal transmission cable according to claim 3, wherein the second HDMI connector comprises the first photo-electric conversion module configured to receive the optical signal transmitted through the cable and convert the optical signal into four-channel high-speed differential pair TMDS signals, and the second photo-electric conversion module being configured to convert the optical signal into low-voltage differential signals, and the second signal conversion module being configured to convert low-voltage differential signals into five-channel low-speed signals.

5. The signal transmission cable according to claim 1, wherein the second HDMI connector comprises the second signal conversion module and a third electro-optic conversion module, and the second signal conversion module is configured to perform conversion between five-channel low-speed signals and low-voltage differential signals, and the third electro-optic conversion module is configured to convert the electric signals, converted by the second signal conversion module, into a third optical signal, and transmit the third optical signal to the cable and the first HDMI connector;

wherein the first HDMI connector comprises a third photo-electric conversion module configured to convert the third optical signal into low-voltage differential signals, and the first signal conversion module being configured to convert low-voltage differential signals into five-channel low-speed signals.

6. The signal transmission cable according to claim 1, wherein the second HDMI connector is electrically connected to a power supply device which is configured to supply electric energy to the second HDMI connector.

7. The signal transmission cable according to claim 6, wherein the power supply device is a USB transmission cable or a power cable.

* * * * *